A. M. FARMER.
PUMP.
APPLICATION FILED OCT. 22, 1915.

1,233,858.

Patented July 17, 1917.

Witnesses
Chas. W. Stauffer
Anna M. Dorr.

Inventor
Albert M. Farmer.

By
Attorneys

UNITED STATES PATENT OFFICE.

ALBERT M. FARMER, OF DETROIT, MICHIGAN.

PUMP.

1,233,858.
Specification of Letters Patent.
Patented July 17, 1917.

Application filed October 22, 1915. Serial No. 57,226.

*To all whom it may concern:*

Be it known that I, ALBERT M. FARMER, a citizen of the United States of America, residing at Detroit, in the county of Wayne and State of Michigan, have invented certain new and useful Improvements in Pumps, of which the following is a specification, reference being had therein to the accompanying drawings.

This invention relates to a pump of the piston or plunger type and to an arrangement of a screw feed therefor whereby the end thrust of the piston is so transmitted as to be distributed over the driving members without undue pressure in any one point that would tend to cause the mechanism to bind.

The invention consists in the matters hereinafter set forth, and more particularly pointed out in the appended claims.

Figure 1:
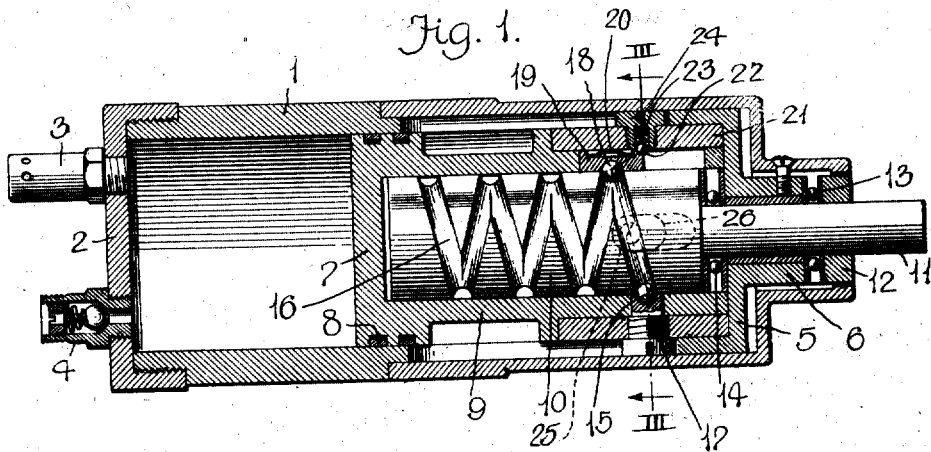
Figure 1 is a view in longitudinal vertical section of a pump that embodies features of the invention.
Figure 2:
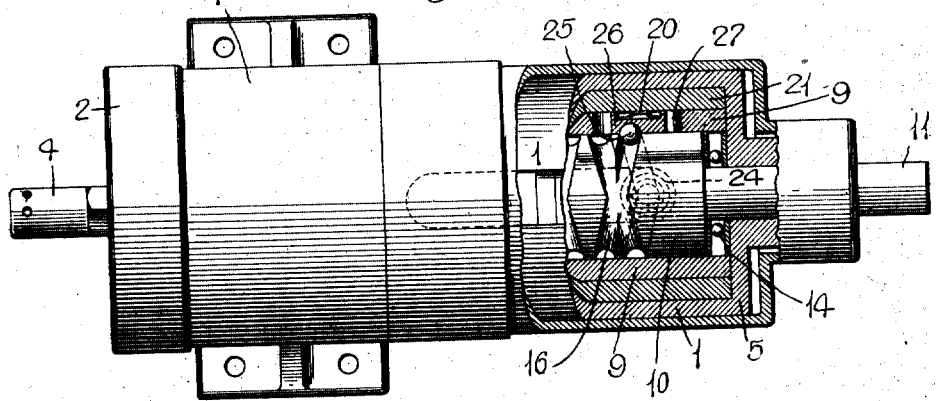
Fig. 2 is a plan view of the pump, partially broken away and partially in section.
Figure 3:
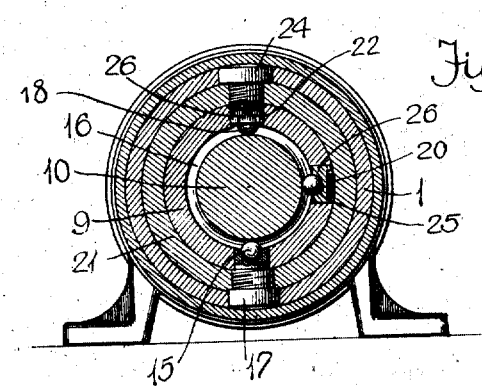
Fig. 3 is a view in cross section taken on or about line III—III of Fig. 1.

Referring to the drawings, a cylinder 1 is closed at one end by a cap or head 2 provided with an automatic intake valve 3 and discharge valve 4, the latter being of any approved type and, herein illustrated, of the ball closure variety. At the other end of the cylinder a head 5 that may be permanently attached to the cylinder, is provided with a bearing boss 6.

A piston 7 that may be of the trunk type and may be slightly reduced below or beyond the packing rings 8 which are employed as usual, is in sliding engagement with the cylinder. The body 9 of the piston is reciprocable and rotatable on a diamond threaded shaft head 10 which is carried by a drive shaft 11 rotatable in the bearing boss 6, a collar 12 formed on or secured to the shaft and appropriately disposed thrust bearings 13 and 14 preventing endwise motion of the shaft. A ball 15 which is entered in the diamond screw 16 of the head 10, is held therein by the cupped or recessed end of a stud 17 secured in the body wall of the piston with the head thereof playing in a slot longitudinally arranged in the wall of the cylinder 1. The ball 15 and its retaining stud 17 are so disposed in relation to the diamond thread that the ball will of itself produce the necessary reciprocating movement in the piston 7 when the shaft 11 is rotated.

In order to assist this movement, and to avoid excessive pressure on the ball 15, another ball 18 is yieldably held in the screw threads by a block 19 backed by a spring member 20 which is in compression between the block and a sleeve 21 that is carried by the body 9 of the piston. The block 19 is reciprocable in a slot longitudinally formed in the piston body 9 of sufficient length so that the block recedes and advances in the piston a distance equal to the half pitch distance of the diamond thread. Therefore when at the beginning of each movement, in accordance with the revolution of the screw thread, the ball 19 assists in driving the piston 7 and relieves to that extent the endwise pressure on the ball 15. To prevent accidental dislodgment of the block when at either end of the limit of motion, a check ball 22 backed by a spring 23 in the recess of a stud 24 yieldingly locks the block and prevents its movement except under the reversal movement of the thread.

To further assist the movement of the block a third ball indicated at 25 is likewise held by a yieldingly pressed slide block 26 in the diamond thread, its movement being insured by a slot 27 that permits the block 26 to advance or recede a distance equal to one-quarter of the pitch distance of the diamond thread.

In operation, considering Fig. 1, and supposing the shaft revolves in an anti-clockwise direction while looking at the figure from the right, the piston is at the beginning of its stroke toward the left and all three balls assist in this movement. When the piston is at a point one-half turn of the shaft from its limit of motion or extreme left position, the ball 18 is at the end of the forward screw. After another one-fourth revolution ball 18 is in the return screw, block 19 sliding to the right of its slot, and ball 25 at the end of the forward screw. After another one-fourth revolution, ball 15 is at the end of the forward screw and the piston on the point of moving to the right, the block 26 at the right end of the slot 27 and the block 19 at the right end of its slot, and hence all the balls are located to assist in moving the piston to the right. Therefore only at the termination of the piston stroke in either direction, is the strain thrown on one or two of the balls alone, that is, within one-quarter and one-half of the shaft revolution of the end of the stroke, and during the last one-quarter of a revolution one ball only is active. The block 19 also moves relatively to piston a distance equal to the pitch of thread, although as, while the block is moving in one direction in the slot, the piston is moving in the other direction, the absolute movement of block 19 is equal to one-half the thread pitch. For the same reason block 26 moves one-half the pitch distance relatively, and one-fourth the pitch distance absolutely. Thus, for the major portion of the movement, three of the balls are in such engagement as to insure against excessive pressure being forced upon any one of them.

As a result the pump acts certainly and noiselessly and does not wear excessively and is automatic and positive in its motion.

Obviously, changes in the details of construction may be made without departing from the spirit of my invention and I do not care to limit myself to any particular form or arrangement of parts.

What I claim is:—

1. A pump comprising a cylinder provided with inlet and discharge valves, a piston reciprocable and non-rotatable in the cylinders, a shaft journaled in the cylinder in sliding and rotatable engagement with the piston, and provided with diamond threads, a member fixed in the piston in engagement with the thread and members longitudinally reciprocal in the piston in engagement with the thread adapted to coöperate with the fixed member in driving the piston longitudinally of the shaft when approaching either limit of their respective movements in the piston.

2. A pump comprising a cylinder having an inlet and outlet discharge valve, a shaft journaled in one end portion of the cylinder and provided with a diamond threaded body extending into the cylinder, a trunk piston reciprocable and non-rotatable in the cylinder and reciprocable and rotatable in relation to the shaft, a fixed driving member traveling with the piston and engaging the diamond thread and other driving members longitudinally reciprocable in the piston in engagement with the thread adapted to coöperate with the fixed member to move the piston when approaching either limit of their range of motion of the piston.

3. A pump comprising a cylinder provided at one end with suitable valves and at the other with a shaft bearing, a shaft rotatable and non-reciprocable in the bearing provided with a diamond threaded body into the cylinder, a trunk piston reciprocable and non-rotatable in the cylinder and reciprocable and rotatable on the shaft body, and means mounted in the piston in engagement with the screw threads of the body and adapted to operate the piston, the means including members longitudinally reciprocable in the piston for following the reversal of the thread.

4. A pump comprising a cylinder having an inlet and a discharge valve, a shaft journaled in one head of the cylinder, a shaft body on the inner end of the shaft concentric with the cylinder provided with a diamond thread, a piston reciprocable in the cylinder and on the shaft body, means on the piston engaging the cylinder and preventing rotation of the piston therein, a driving member in the piston engaging the diamond thread for shifting the piston, and coöperating driving members having limited longitudinal movement in the piston, and engaging the thread of the shaft body.

5. A pump comprising a cylinder having a valve head at one end and a shaft bearing head at the other, a shaft journaled in the bearing head, thrust bearings preventing longitudinal movement of the shaft, a diamond threaded body on the shaft in the cylinder, a trunk piston reciprocable and non-rotatable in the cylinder, and on the shaft body, and anti-friction driving members mounted in the piston and engaging the diamond thread, some of the members having limited longitudinal movement in the piston.

In testimony whereof I affix my signature in presence of two witnesses.

ALBERT M. FARMER.

Witnesses:
 ANNA M. DORR,
 C. R. STICKNEY.